United States Patent [19]

Sakata

[11] 4,300,649
[45] Nov. 17, 1981

[54] ENGINE MOUNTING STRUCTURE FOR VEHICLES

[75] Inventor: Mamoru Sakata, Oizumigakuenmachi, Japan

[73] Assignee: Honda Giken Kogyo Kabushiki Kaisha, Tokyo, Japan

[21] Appl. No.: 6,568

[22] Filed: Jan. 26, 1979

[30] Foreign Application Priority Data

Feb. 7, 1978 [JP] Japan .................. 53-14039[U]

[51] Int. Cl.³ .............................................. B60K 5/04
[52] U.S. Cl. .............................. 180/55; 180/54 F; 180/56; 180/297
[58] Field of Search .................. 180/54 F, 55, 56, 297

[56] References Cited

U.S. PATENT DOCUMENTS

| | | | |
|---|---|---|---|
| 2,096,541 | 10/1937 | Haltenberger | 180/54 F |
| 2,199,517 | 5/1940 | Best | 180/54 F |
| 2,988,162 | 6/1961 | Hansen | 180/56 |
| 3,399,743 | 9/1968 | Hetmann | 180/55 |
| 3,420,327 | 1/1969 | Nallinger et al. | 180/255 |

FOREIGN PATENT DOCUMENTS

896542 5/1962 United Kingdom ............. 180/54 F

Primary Examiner—Joseph F. Peters, Jr.
Assistant Examiner—Milton L. Smith
Attorney, Agent, or Firm—Irving M. Weiner; Pamela S. Burt; John L. Shortley

[57] ABSTRACT

An engine mounting structure for a vehicle of the front-engine, front-drive or rear-engine, rear-drive type, wherein an engine and a transmission are separately mounted with the output shaft of the engine and the input shaft of the transmission interconnected through a universal joint. The engine and the transmission are independently supported on the vehicle body through rubber mounts. With such an arrangement, vibrations from the engine can be effectively prevented, and the engine and the transmission can be reliably mounted on the body through supports which are respectively suitable for them.

7 Claims, 5 Drawing Figures

ENGINE MOUNTING STRUCTURE FOR VEHICLES

BACKGROUND OF THE INVENTION

1. Field of the Invention

The present invention relates generally to an engine mounting structure for vehicles, and more particularly to a structure for mounting and supporting an engine on the body of a front-engine, front-drive type vehicle or a rear-engine, rear-drive type vehicle.

2. Description of the Prior Art

The conventional mounting arrangement of an engine with its crank shaft extending laterally or transversely of the longitudinal direction of a vehicle of the front-engine, front-drive or rear-engine, rear-drive type is shown in FIG. 5 of the accompanying drawings.

In such prior or conventional mounting arrangement, an engine 1 and a transmission 2 are integrally connected together, with the engine mounted at its one end by a rubber mount 3 on a bracket on the vehicle body and with the transmission 2 mounted at the one end thereof connected to the engine 1 by a pair of rubber mounts 4, 5 on similar vehicle body brackets. The transmission 2 has a differential 6 having a driving shaft 7 with the ends thereof coupled via joints 8, 8 to a pair of driving axles 9, 10 which are in turn connected to a pair of traction wheels 11, 12, respectively. Such conventional engine mounting structure has suffered from the following drawbacks resulting from integral connection between the engine 1 and the transmission 2.

Vibrations produced by the laterally arranged engine while it is running and reactive forces from the driving axles while it is revolving, act upon the mounts 3, 4 and 5. The forces include impacts acting upon the driving axle from the road surface, such as during rapid starting or acceleration of the vehicle. Such reactive forces are transmitted through the transmission to the engine connected thereto and act upon the engine mounts. Therefore, in addition to an arrangement for the prevention of engine vibrations, provision must be made for the mounts 3, 4 and 5 to bear reactive forces.

It is preferable and desirable for the mounts 3, 4 and 5 to have a degree of resiliency required for absorbing engine vibrations effectively. From the standpoint of withstanding the reactive forces acting on the engine, however, the mounts should be as rigid as possible, in contrast to the requirement for resiliency to provide engine vibration absorption. As a compromise, the mounts have been made to have a non-linear spring characteristic. Alternatively, there has been provided a stop for preventing large vibrations. With these prior attempts, the engine rubber mounts cannot adequately function as required, and vibrations are transmitted to the vehicle body. As a result, the vehicle compartment will not be protected from vibrations and noises, and the passengers will suffer a lessened degree of comfort. It has therefore long been desired to provide vehicles of the above-described type with an improved engine mounting structure.

The present invention effectively solves the foregoing problems attendant prior engine mounting structures in front-engine, front-drive or rear-engine, rear-drive vehicles.

SUMMARY OF THE INVENTION

The present invention provides an engine mounting structure for a front-engine, front-drive or rear-engine, rear-drive vehicle. An engine is disposed laterally relative to the body of the vehicle, and a transmission is disposed adjacent to the engine and separated from the engine. Rubber mount means are provided for independently mounting the engine and the transmission on the body of the vehicle. The engine is provided with an output shaft, and the transmission is provided with an input shaft, with the output shaft of the engine and the input shaft of the transmission being interconnected by a universal joint.

It is an object of the present invention to provide an engine mounting structure for front-engine, front-drive or rear-engine, rear-drive vehicles, wherein an engine is mounted separately from a transmission with the output and input shafts thereof connected together through universal joints. The engine and transmission are independently mounted and supportd via rubber mounts on the vehicle body. With the engine and the transmission independently mounted via rubber mounts on the vehicle body, the engine can be supported, irrespective of the tranmission, by rubber mounts having spring characteristics necessary for the prevention of vibrations, there being no need to protect against reactive forces acting thereon during driving of the vehicle. Because the engine is mounted by an anti-vibration structure with no provision for protecting against driving reactive forces, engine vibrations and noises are suppressed and prevented for an enhanced degree of comfort in the front-engine, front-drive or rear-engine, rear-drive type of vehicles.

It is another object of the present invention to provide an engine mounting structure in which a transmission and an engine are mounted separately on a vehicle body, with the tranmission being so supported as to protect only against reactive forces acting thereon during driving, with no provision against vibrations from the engine. Therefore, the transmission can be protected from vibrations and impacts on quick torque variations caused by rapid starting and acceleration, whereby an improved degree of riding comfort can be attained, irrespective of running and driving conditions.

Still another object of the present invention is to provide an engine mounting structure in which a transmission, supported independently of an engine, can be inclined so as to equalize outboard joint angles for both traction wheels, to thereby effectively protect against wavery steering during acceleration so as to improve driving characteristics of the vehicle.

Yet another object of the present invention is to provide an effective engine mounting structure which is simple in structure and inexpensive to manufacture. The mounting structure according to the present invention also provides enhanced riding comfort in front-engine, front-drive or rear-engine, rear-drive vehicles. The engine mounting structure supports an engine and a transmission separately, with the output and input shafts thereof connected together via universal joints, without necessitating modification of rubber mounts, resilient means, and support structure, and without employing special or complicated components.

Other objects and advantages of the present invention will become apparent from the following description when read in conjunction with the accompanying drawings, which illustrate preferred embodiments by way of example.

DETAILED DESCRIPTION

Figure 1:
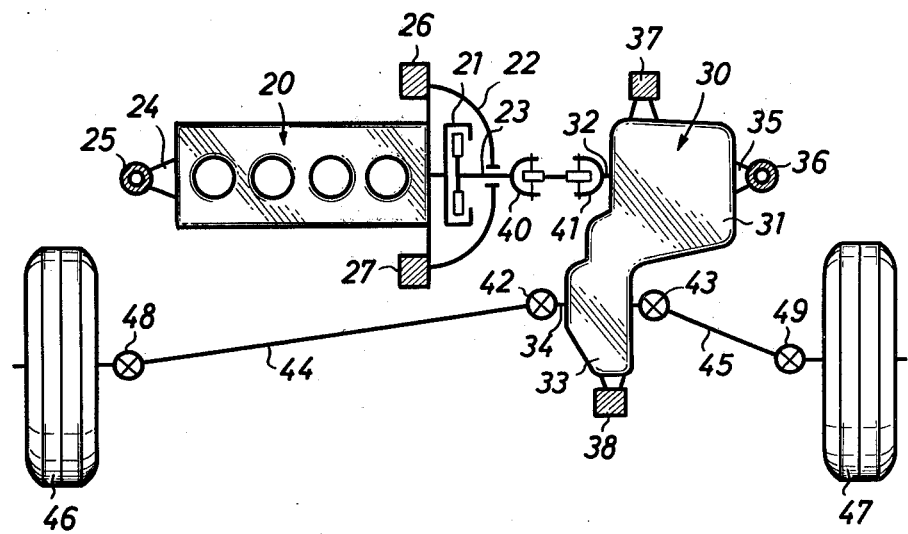
FIG. 1 is a schematic planar view of a first embodiment according to the invention.

FIG. 1 schematically illustrates an engine mounting structure in accordance with a first embodiment of the invention. An engine 20 is arranged laterally or extending transversely in an engine compartment or room at the front or rear of a vehicle body (not shown). A clutch 21 is connected to an inner end of engine 20 which is adjacent to a transmission 30. The engine 20 is mounted at its outer end on the body of the vehicle by a bracket 24 and a rubber mount 25. The clutch 21 has a housing 22 mounted at its ends on the vehicle body by a pair of rubber mounts 26, 27. The rubber mounts 25, 26 and 27 which support engine 20 have a suitable degree of resiliency with sufficient spring characteristics for absorbing vibrations from the engine. Such rubber mounts need not protect against reactive forces caused during driving and transmitted from tansmission 30.

Transmission 30 is located adjacent to engine 20 with its shaft 32 in line with the shaft 23 of engine 20. The transmission 30 has a casing 31 with its outer side mounted on the vehicle body by a bracket 35 and a rubber mount 36. The transmission casing 31 is also mounted on the vehicle body at front and rear ends of casing 31 by a pair of rubber mounts 37, 38. The rubber mounts 36, 37, 38, which support the transmission 30, are subjected to reactive forces acting on the transmission 30 during driving and to small vibrations such as gear noises which are much lesser in degree than vibrations from engine 20. Accordingly, the rubber mounts 36, 37 and 38 are made rigid to protect against reactive forces. Such reactive forces are effectively borne by a sufficiently large span set between rubber mounts 37, 38 and by the rigid spring characteristics of mounts 36, 37 and 38.

The clutch 21 attached to engine 20 is provided with the shaft output 23 which is in opposed relation to the input shaft 32 of transmission 30, the shafts 23, 32 being interconnected by a pair of universal joints 40, 41. The transmission 30 has a differential 33 from which extends an output shaft 34, which is substantially parallel to engine output shaft 23 and is spaced apart therefrom in the longitudinal direction of the vehicle. The respective distal ends of shaft 34 are directly connected via joints 42, 43 to driving axle 44, 45, respectively. The driving axles 44, 45 are connected to traction wheels 46, 47, respectively, so as to drive the wheels.

With such an arrangement, engine 20 and transmission 30 are separately mounted in lateral disposition and are supported by the set of rubber mounts 25, 26, 27 and the set of rubber mounts 36, 37, 38, respectively. The rubber mounts 25, 26 and 27 support the engine so as to be resiliently loaded for protection from vibrations, and the rubber mounts 36, 37 and 38 support the transmission so as to be rigidly loaded for protection from reactive forces from the wheels.

Although clutch 21 is attached to engine 20 in the illustrated embodiment, the clutch may alternatively be attached to transmission 30, which is a preferable arrangement when the transmission is of the automatic type.

Figure 2:
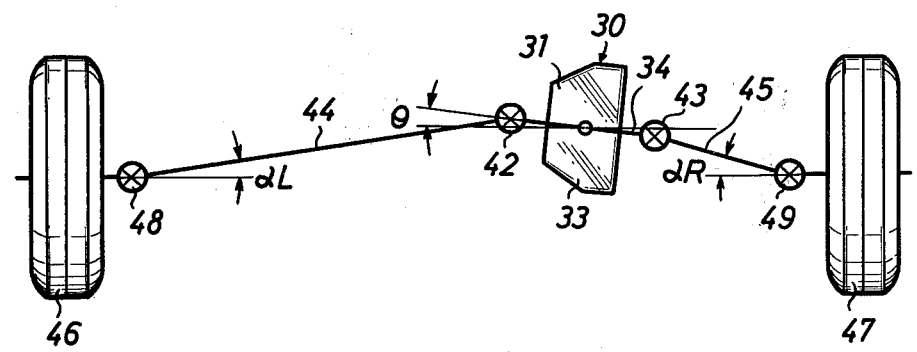
FIG. 2 is a schematic front or rear elevational view of the first embodiment of the invention.

FIG. 2 is a front or rear elevational view of the structure of FIG. 1, with engine 20 omitted for clarity. Because transmission 30 is supported independently of engine 20 as described above, transmission 30 can be inclined at an angle of $\theta°$ to the horizontal. Thus, the driving axles 44, 45 can be supported with angles $\alpha L$, $\alpha R$ at outboard joints 48, 49, with $\alpha L$ substantially equal to $\alpha R$, particularly in the vertical plane. This arrangement effectively prevents wavery steering during acceleration of the vehicle.

Figure 3:
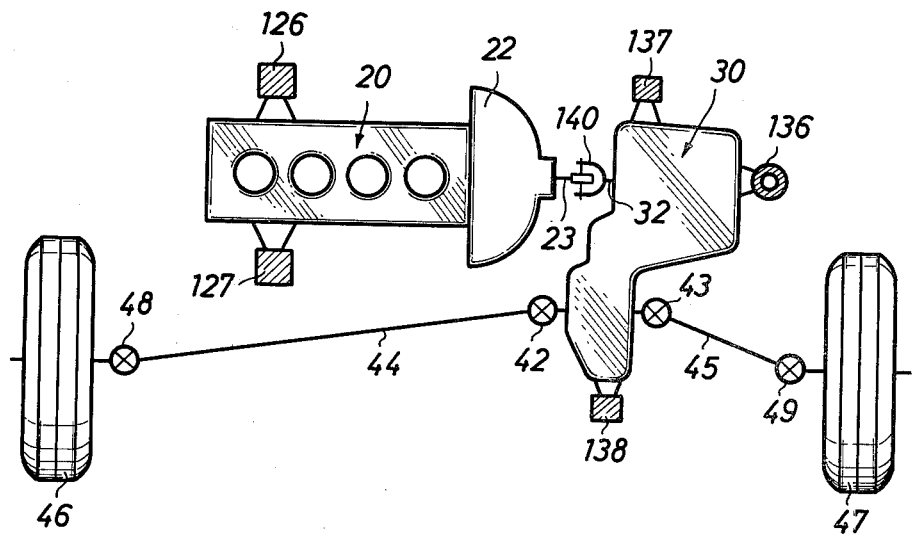
FIG. 3 is a schematic planar view of a second embodiment of the invention.

FIG. 3 illustrates a second embodiment of the invention, wherein like reference numerals denote like parts in FIGS. 1 and 2.

According to the second embodiment, engine 20 is supported by rubber mounts 126, 127 at front and rear points near the outer end of engine 20. The output shaft 23 of engine 20 is connected to the input shaft 32 of transmission 30 through one universal joint 140. The transmission 30 is supported by three rubber mounts 136, 137 and 138.

Figure 4:
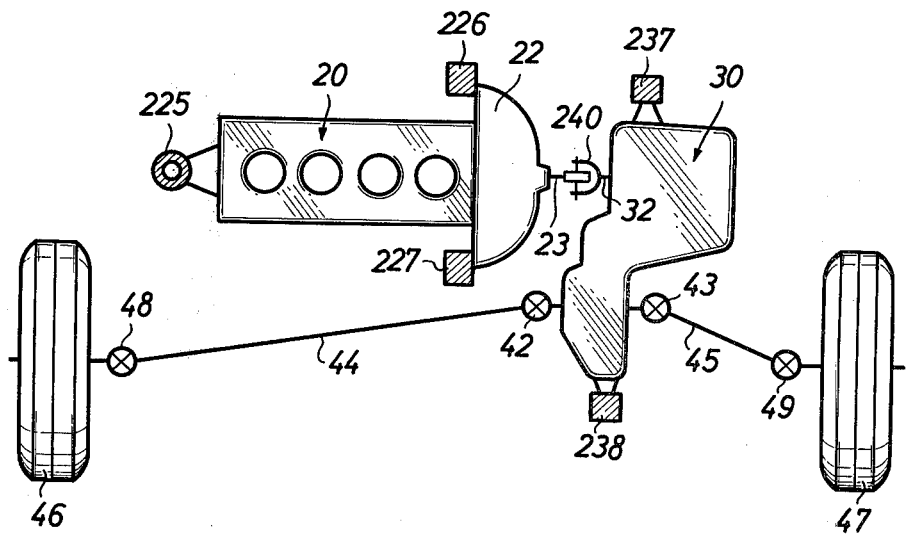
FIG. 4 is a schematic planar view of a third embodiment of the invention.
Figure 5:
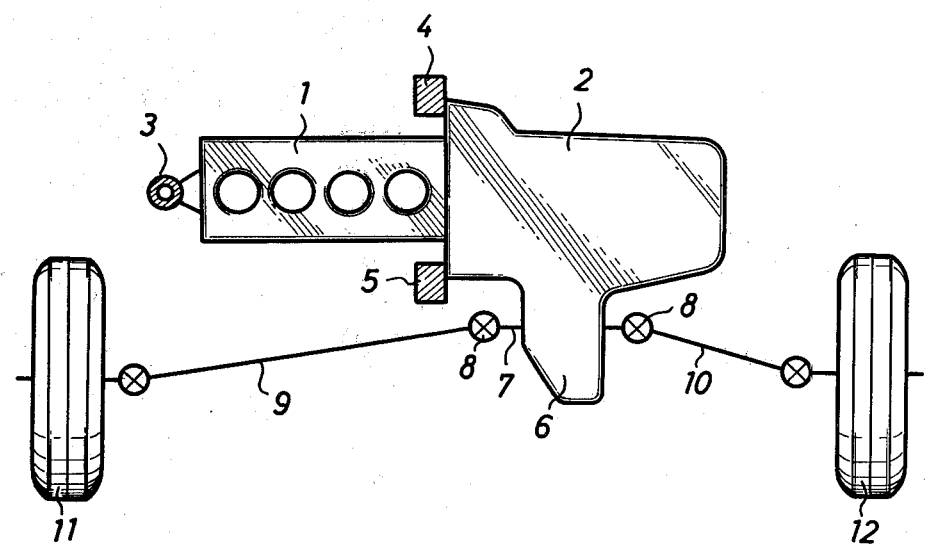
FIG. 5 is a schematic planar view of a conventional mounting structure.

According to a third embodiment of the invention as shown in FIG. 4, engine 20 is supported by three rubber mounts 225, 226 and 227. The transmission 30 is supported by front and rear rubber mounts 237, 238 with a large span therebetween, and the shifts 23, 32 are interconnected via one universal joint 240.

While preferred embodiments of the present invention have been described in detail hereinabove, it will be understood that various changes and modifications may be made therein without departing from the scope of the appended claims.

I claim:

1. An engine mounting structure for a front-engine, front-drive or rear-engine, rear-drive vehicle wherein an output shaft of an engine extends substantially parallel to, and is spaced apart in the longiitudinal direction of said vehicle from, an output shaft of a transmission, said output shaft of said transmission being directly connected to a pair of driving axles which are in turn respectively connected to a pair of traction wheels, comprising:

first and second rubber mount means for independently mounting said engine and said transmission, respectively, on the body of said vehicle;

said engine being disposed laterally relative to the body of said vehicle;

said transmission being disposed adjacent to said engine and separated from said engine;

said transmission being provided with an input shaft;

a universal joint interconnecting said output shaft of said engine and said input shaft of said transmission;

said first rubber mount means including at most three substantially resilient rubber mounts for supporting said engine on the body of said vehicle;

said first rubber mount means being disposed at at least front and rear ends of said engine;

said second rubber mount means including at most three substantially rigid rubber mounts for supporting said transmission on the body of said vehicle; and said second rubber mount means being disposed at at least front and rear ends of said transmission.

2. An engine mounting structure according to claim 1, wherein:
   said transmission is inclined with respect to the horizontal; and
   said pair of traction wheels are respectively coupled to said pair of driving axles through outboard joints having substantially equal joint angles.

3. An engine mounting structure according to claim 1, wherein:
   said first rubber mount means comprises a first rubber mount for supporting said engine on the body of said vehicle at an outer side end of said engine, a second rubber mount for supporting said engine on the body of said vehicle at a front end of said engine, and a third rubber mount for supporting said engine on the body of said vehicle at a rear end of said engine spaced from said front end; and
   said transmission is supported on the body of said vehicle at an outer side end and spaced front and rear ends of said transmission.

4. An engine mounting structure according to claim 1, wherein:
   said first rubber mount means comprises a rubber mount for supporting said engine on the body of said vehicle at a front end of said engine and a rubber mount for supporting said engine on the body of said vehicle at a rear end of said engine; and
   said second rubber mount means comprises a first rubber mount for supporting said transmission on the body of said vehicle at an outer side end of said transmission, a second rubber mount for supporting said transmission on the body of said vehicle at a front end of said transmission, and a third rubber mount for supporting said transmission on the body of said vehicle at a rear end of said transmission.

5. An engine mounting structure according to claim 1, wherein:
   said first rubber mount means comprises a first rubber mount for supporting said engine on the body of said vehicle at an outer side end of said engine, a second rubber mount for supporting said engine on the body of said vehicle at a front end of said engine, and a third rubber mount for supporting said engine on the body of said vehicle at a rear end of said engine; and
   said second rubber mount means comprises a fourth rubber mount for supporting said transmission on the body of said vehicle at a front end of said transmission, and a fifth rubber mount for supporting said transmission on the body of said vehicle at a rear end of said transmission.

6. An engine mounting structure according to claim 5, wherein:
   said first, second and third rubber mounts are substantially resilient; and
   said fourth and fifth rubber mounts are substantially rigid.

7. An engine mounting structure for a front-engine, front-drive or rear-engine, rear-drive vehicle, comprising:
   an engine disposed laterally relative to the body of said vehicle;
   a transmission disposed adjacent to said engine and separated from said engine;
   rubber mount means for independently mounting said engine and said transmission on the body of said vehicle;
   said engine being provided with an output shaft;
   said transmission being provided with an input shaft;
   a universal joint interconnecting said output shaft of said engine and said input shaft of said transmission;
   said transmission being inclined with respect to the horizontal;
   said transmission being provided with an output shaft;
   a pair of driving axles connected to said output shaft of said transmission; and
   a pair of traction wheels respectively coupled to said pair of driving axles through outboard joints having substantially equal joint angles.

* * * * *